Feb. 4, 1941. J. S. CAREY 2,230,219
PRODUCTION OF HYDROCARBONS
Filed Feb. 11, 1937
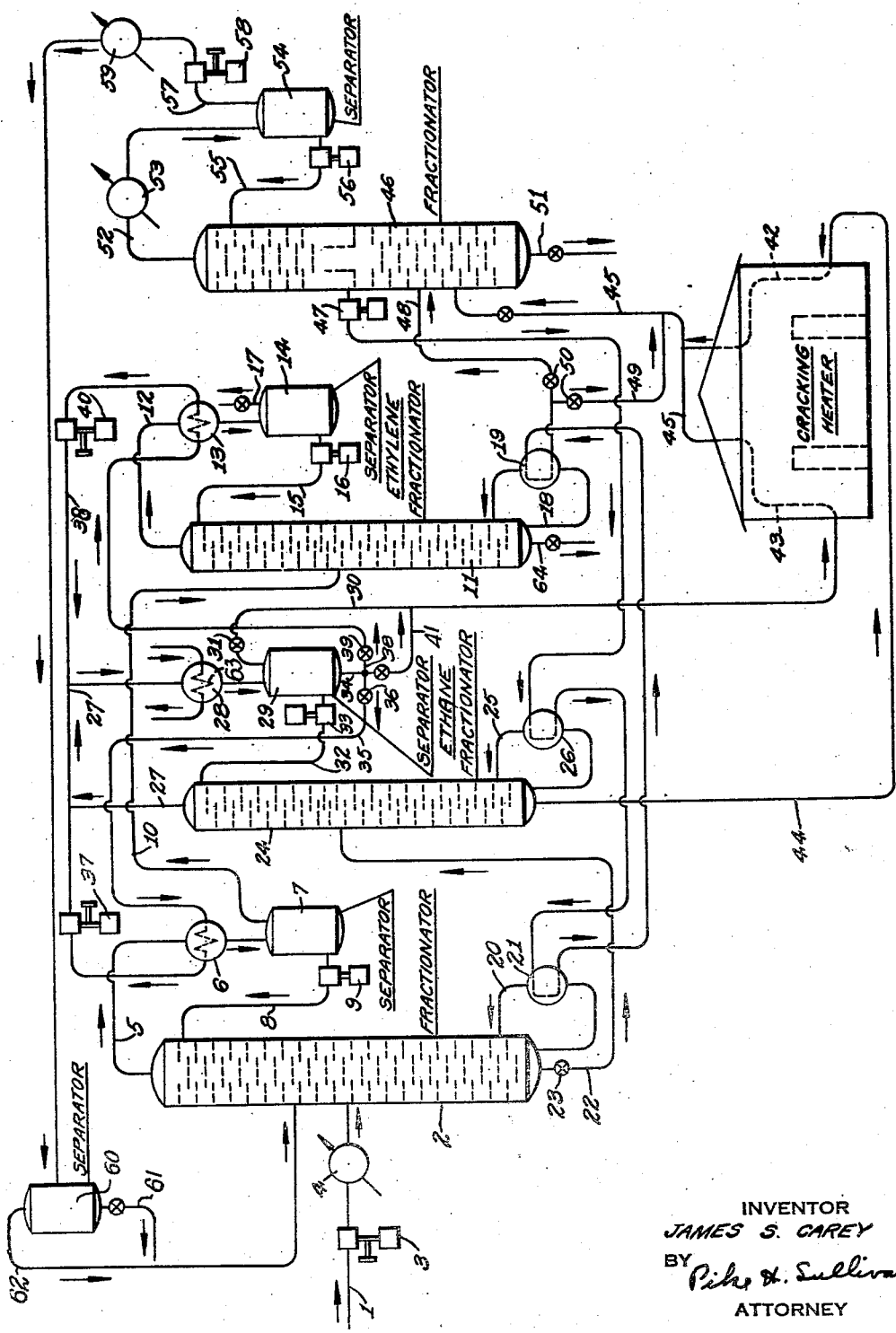
INVENTOR
JAMES S. CAREY
BY *Pike & Sullivan*
ATTORNEY Patented Feb. 4, 1941

2,230,219

UNITED STATES PATENT OFFICE 2,230,219

PRODUCTION OF HYDROCARBONS

James S. Carey, Cranford, N. J., assignor to The M. W. Kellogg Company, New York, N. Y., a corporation of Delaware Application February 11, 1937, Serial No. 125,179

5 Claims. (Cl. 196—10)

This invention relates to the production of ethylene, and more particularly to the production of ethylene and a normally liquid fraction from a mixture of gases comprising fixed gases, such as hydrogen and methane, and $C_2$, $C_3$ and $C_4$ hydrocarbons, including both olefins and paraffins, such as a gas resulting from an oil cracking operation.

It is an object of the invention to provide a continuous process of producing ethylene wherein a gaseous stream, such as described above, is converted to ethylene, fixed gases, fuel oil and a fraction within the motor fuel boiling range. It is a further object to provide a process of producing ethylene from a mixture of gases of the nature described wherein the refrigerant necessary to accomplish fractionation of ethylene and lighter gases from ethane and heavier gases, and separation of ethylene from lighter gases, is produced as an intermediate product in the process.

The accompanying drawing is a diagrammatic plan of apparatus suitable for carrying on the novel process but it is to be understood that the apparatus set forth is for the purpose of illustration, and the invention is not necessarily limited by the physical limitations of the apparatus illustrated but is capable of other modifications.

Referring to the drawing for a detailed description of an example of the invention, a stream of gases comprising fixed gases, such as hydrogen and methane and $C_2$, $C_3$ and $C_4$ hydrocarbons, including both olefins and paraffins, such as the overhead from a stabilizer in an oil cracking apparatus, is introduced to the system in line 1 and is passed to fractionating tower 2 wherein the pressure is maintained at the degree necessary to carry on a fractionation of the gaseous stream into an overhead which contains substantially all the ethylene contained in the gaseous stream, together with lighter gases, and a condensate containing substantially all the ethane contained in the gaseous stream, together with heavier gases. This separation may be accomplished, for example, by maintaining the fractionating tower 2 at a pressure of about 495 pounds per square inch absolute with a temperature of about —20° F. at the top of the tower. The pressure is effected by means of compressor 3 in line 1, and the incoming gases are ordinarily cooled by passage through cooler 4. The overhead gases from tower 2 are withdrawn through line 5 and passed through cooler 6 wherein they are refrigerated to condense a portion thereof. This may be accomplished by cooling them to a degree whereby they emerge from cooler 6 at a temperature of approximately —60° F. The mixture of condensate and uncondensed gases is separated in separator 7, and the condensate is returned as reflux to tower 2 through line 8 by means of pump 9. The overhead gases in line 5 may contain a small proportion of ethane and heavier gases so that the partial condensation and separation in separator 7 effect a further removal of ethane from the gaseous stream, a large proportion of which is condensed together with some ethylene. The return of these condensed gases to fractionating tower 2 is regulated to maintain the proper temperature at the top of tower 2.

The uncondensed gases are withdrawn from separator 7 through line 10 and consist of any hydrogen, methane, and substantially all the ethylene contained in the gases introduced in fractionator 2 with, at most, a minor proportion of gases of higher molecular weight. The gases pass through line 10 to fractionating tower 11, which is preferably maintained at the same pressure as tower 2 and wherein ethylene is separated from fixed gases by suitable regulation of temperature. For example, with a pressure of 495 pounds per square inch absolute in tower 11 the top temperature may suitably be maintained at about —30° F. The gases which pass overhead from tower 11 through line 12 contain substantially all the fixed gases introduced to tower 2 with at most a minor proportion of ethylene, a major proportion of the ethylene having been condensed and refluxed to the bottom of tower 11. The overhead gases from tower 11 withdrawn through line 12 are refrigerated in cooler 13 to condense a portion thereof including substantially all the ethylene and some methane, which condensate is separated in separator 14 and returned to tower 11 through line 15 by means of pump 16 whereby the proper temperature is maintained in the top of tower 11. The refrigeration of the gases in cooler 13 may be suitably carried out whereby they emerge from the cooler at a temperature of about —70° F. The fixed gases are withdrawn from separator 14 through line 17 and may be suitably utilized elsewhere as a source of energy and refrigeration by expansion and heat exchange.

To effect a complete removal of fixed gases from the ethylene cooled in the bottom of tower 11 a temperature of about 40° F. may be maintained under the conditions set forth above by means of, for example, the reboiling of a portion thereof and its return to the tower 11, by means of circuit 18, which includes heat exchanger 19.

Ethylene, which is a product of the system, is withdrawn from the bottom of tower 11 through line 64.

The condensate collected in the bottom of tower 2 may be maintained at a temperature, under the conditions set forth above, of approximately 100° F. to facilitate the removal of fixed gases and ethylene therefrom. This may be effected by reboiling a portion thereof and returning it to the tower 2, by means of circuit 20 which contains heat exchanger 21.

Condensate is withdrawn from fractionating tower 2 through line 22 and may be released to a substantially lower pressure by means of valve 23. The condensate is introduced to fractionating tower 24 from line 22, which fractionating tower is suitably maintained at conditions of temperature and pressure to effect a separation of ethane from heavier gases. For example, tower 24 may be maintained at a pressure of approximately 265 pounds per square inch absolute with a temperature in the top of the tower of about 25° F. The heavier hydrocarbons collect in the bottom of tower 24 and are maintained at a temperature sufficient to facilitate the complete removal of ethane therefrom, for example, under the conditions set forth above at a temperature of about 170° F. The maintenance of this temperature may be accomplished by withdrawing a portion of the liquid from the bottom of tower 24, reboiling it and returning it to tower 24, by means of circuit 25 which contains heat exchanger 26.

The overhead gases from tower 24, consisting essentially of substantially all the ethane introduced to tower 2 and containing at most a minor proportion of heavier hydrocarbons, are withdrawn through line 27 and are passed through cooler 28 wherein they are refrigerated to a degree sufficient to condense a portion thereof, said condensate consisting of substantially all hydrocarbons heavier than ethane contained in the overhead, and including a portion of the ethane. To effect such condensation the gases may be cooled in cooler 28 to a degree whereby they emerge from cooler 28 at a temperature of about 10° F. The mixture of gases and condensate is introduced to separator 29 wherein the condensate collects in the bottom of the separator, and the uncondensed gases pass overhead through line 30, valve 31 being provided to maintain the pressure in the separator 29. A portion of the condensate in separator 29 is returned to tower 24 through line 32 by means of pump 33 as reflux to maintain the proper temperature in the top of fractionating tower 24. A second portion of condensate from separator 29 is withdrawn through lines 34 and 35 and expanded by means of valve 36 through cooler 6 whereby the expanded condensate acts as the refrigerant in refrigerating the overhead gases from tower 2 to a suitable temperature, for example, to a temperature of −60° F. The gases resulting from the expansion of the condensate through cooler 6 are returned to line 27 by means of compressor 37 and are returned for condensation in cooler 28.

A third portion of the condensate in separator 29 may be withdrawn therefrom through lines 34 and 38 and expanded by means of valve 39 through cooler 13 wherein the expanded condensate acts as the refrigerant in cooling the overhead gases in line 12, for example, to a temperature of −70° F. The gases resulting from the expansion of the condensate are returned to line 27 by means of compressor 40 and are returned for condensation in cooler 28.

The refrigerant for cooler 28 may be ammonia supplied from a suitable source and cooled, for example, to a temperature of −7° F., or the refrigerant may be suitably cooled and compressed propane, produced from the system, as described below.

Any condensate in separator 29 not utilized as reflux or refrigerant may be withdrawn through lines 34 and 41 and combined with the overhead gases from separator 29 in line 30.

The condensate from the bottom of tower 24 withdrawn through line 44, consisting essentially of liquefied $C_3$ and $C_4$ hydrocarbons, and the gases in line 30, consisting essentially of ethane, are passed to cracking coils 42 and 43, respectively, wherein they are heated to the temperatures appropriate to effect the most efficient cracking of each, with a view to producing a maximum of ethylene. For example, the $C_3$ and $C_4$ hydrocarbons may be heated to a temperature of approximately 1450° F., and the ethane may be heated to a temperature of approximately 1600° F., the pressure being 0 to 400 pounds per square inch in each coil. The ethane and the $C_3$ and $C_4$ hydrocarbons may be suitably utilized as the refrigerants in various coolers in the system, for example, coolers 4, 53 and 59 may be suitably preheated (by means not shown) preliminary to cracking.

The cracked products from both cracking operations, withdrawn through line 45, are suitably quenched, as described below, and passed to fractionating tower 46, which may be maintained suitably at a pressure of 40 pounds per square inch absolute. In fractionator 46 the temperatures are maintained to produce an overhead including the normally gaseous hydrocarbons and a portion of the hydrocarbons in the motor fuel boiling range. For this purpose a top temperature of about 250° F. may be suitably maintained by refluxing. A side stream is withdrawn from tower 46 by pump 47 and circulated through reboiler circuit 48 which passes successively through heat exchangers 26, 21 and 19. A portion of the side stream passing through the reboiler circuit may be withdrawn through line 49 and used as the quench for the cracked products in line 45, valves 50 being provided to regulate the quantity of quench used.

The heavy hydrocarbons produced in the cracking operations are collected in the bottom of tower 46 where a temperature of about 725° F. is suitably maintained, and bottoms, suitable for fuel oil are removed through line 51.

The overhead from tower 46 is withdrawn through line 52, passed through cooler 53 wherein it is cooled to condense a portion thereof, which is collected in separator 54 and returned as reflux to tower 46 through line 55 by means of pump 56 to maintain the proper temperature in the top of tower 46. The uncondensed gases separated in separator 54, consisting of fixed gases and $C_2$, $C_3$ and $C_4$ hydrocarbons, together with heavier hydrocarbons in the motor fuel boiling range, are withdrawn through line 57, compressed and cooled by compressor 58 and cooler 59 to condense the hydrocarbons having more than 4 carbon atoms in each molecule and passed to separator 60 wherein the uncondensed gases and the condensate are separated. The condensate, consisting of hydrocarbons in the motor fuel boiling range, is withdrawn from separator 60 through line 61 and may be passed to the stabilizer of an oil cracking system. The uncondensed gases, which may have substantially the composition of the gas stream introduced in line 1, are withdrawn from separator 60 through line 62 and introduced to tower 2 as part of the gaseous charge thereto.

For certain operations in which ethylene is a raw material the presence of fixed gas, such as hydrogen and methane, is not objectionable. Where the product of this process is intended for use in such operations the separation of ethylene from these fixed gases is not necessary. Wherefore, tower 11 and those portions of the apparatus necessary for its operation may be omitted.

Alternatively, the $C_3$ and $C_4$ hydrocarbons withdrawn from the bottom of tower 24 through line 44 may be fractionated to separate them into a fraction consisting essentially of $C_3$ hydrocarbons and a fraction consisting essentially of $C_4$ hydrocarbons. The $C_3$ fraction may be then used as the refrigerant in the cooler 28 by expanding it through line 63 in a manner similar to the expansion of the condensate from separator 29 through line 35 and cooler 6. With such operation the $C_3$ and $C_4$ hydrocarbons may be separately subjected to cracking operations best suited to produce efficient cracking with a maximum production of ethylene, or they may be combined and subjected to a single cracking operation, as shown above.

Fractionating towers 2, 11, 24, and 46 are provided with suitable trays to provide intimate contact of the gases and liquids contained therein for carrying on the condensation, stripping, and vaporizing operations necessary to effect the desired fractionation. It is apparent also that means for maintaining the proper temperatures in the bottoms of these towers, other than that shown, may be provided within the scope of the invention.

The invention provides a continuous process for the production of ethylene either in a substantially pure state or in admixture with fixed gases. The fractionation of the gases in tower 2 necessitates the use of a refrigerant to maintain the proper temperature in the top of tower 2, having an extremely low boiling point. It is an advantage of the present invention that the process provides such a refrigerant in the form of the condensate in separator 29 as an intermediate product. This condensate serves to remove substantially the last portion of hydrocarbons heavier than ethane from the overhead gases from tower 24 and serves as the reflux for maintaining proper temperature conditions in tower 24 and as the refrigerant for cooler 6 merely by the expansion of the condensate against the proper vacuum provided by compressor 37. Where it is desired to separate ethylene from the fixed gases this separation is facilitated by the use of condensate from separator 29 as refrigerant in the same manner of utilization as in cooler 6 whereby a portion of the condensate is expanded through cooler 13 against a vacuum maintained by compressor 40.

The invention therefore provides an efficient, self-contained process which provides its own refrigerant, requiring merely the passage of a conventional refrigerant such as ammonia through line 63 of the cooler 28.

The separation of ethane from the heavier hydrocarbons also facilitates the efficient cracking of the ethane to produce a cracked product containing a maximum proportion of ethylene and of the cracking of the $C_3$ and $C_4$ hydrocarbons to produce a cracked product containing a maximum proportion of ethylene. The fixed gases may be utilized as heretofore, and the fraction in the boiling range of motor fuel may be suitably passed to a stabilizer in an oil cracking system, which stabilizer may be the source of the feed gases.

It is to be understood that the foregoing description refers primarily to an illustrative embodiment of the invention, which invention is capable of other embodiments and variations without departing from its essential scope.

I claim:

1. The method of treating a stream of gases comprising essentially normally gaseous paraffinic and olefinic hydrocarbons having from one to four atoms in each molecule to produce ethylene therefrom which comprises, fractionating said stream into a liquid substream containing a major proportion of the ethane and higher boiling hydrocarbons of said stream and a gaseous overhead substream containing a major proportion of the ethylene and lighter components of said stream, fractionating the ethane substream to produce a gaseous overhead containing substantially all the ethane of said substream, refrigerating said ethane overhead under pressure to liquefy a portion thereof, expanding a portion of said liquefied ethane overhead in indirect contact with the ethylene overhead from the first-mentioned fractionation to liquefy a portion thereof, and refluxing said liquefied ethylene overhead to said first-mentioned fractionating operation.

2. The method of treating a stream of gases comprising essentially normally gaseous paraffinic and olefinic hydrocarbons having from one to four atoms in each molecule to produce ethylene therefrom which comprises, fractionating said stream into a liquid substream containing a major proportion of the ethane and higher boiling hydrocarbons of said stream and a gaseous overhead substream containing a major proportion of the ethylene and lighter components of said stream, fractionating the ethane substream to produce a gaseous overhead containing substantially all the ethane of said substream, refrigerating said ethane overhead under pressure to liquefy a portion thereof, expanding a portion of said liquefied ethane overhead in indirect contact with the ethylene overhead from the first-mentioned fractionating operation to liquefy a portion thereof, refluxing said liquefied ethylene overhead to said fractionating operation, fractionating the ethylene substream to produce a gaseous overhead comprising essentially fixed gases and a liquid fraction consisting essentially of liquefied ethylene and containing substantially all the ethylene contained in said substream, and expanding another portion of said liquefied ethane overhead in indirect contact with the gaseous overhead from the fractionation of said ethylene substream to liquefy a portion thereof and refluxing said liquefied gaseous overhead to said fractionating operation.

3. The method of treating a stream of gases comprising essentially normally gaseous paraffinic and olefinic hydrocarbons having from one to four atoms in each molecule to produce ethylene therefrom which comprises, fractionating said stream into a liquid substream containing a major proportion of the ethane and higher boiling hydrocarbons of said stream and a gaseous overhead substream containing a major proportion of the ethylene and lighter components of said stream, fractionating the ethane substream to produce a gaseous overhead containing substantially all the ethane of said substream, refrigerating said ethane overhead under pressure to liquefy a portion thereof, expanding a portion of said liquefied ethane overhead in indirect contact with the ethylene overhead from the first-mentioned fractionation to liquefy a portion thereof, a refluxing said liquefied ethylene overhead to said first-mentioned fractionating operation, separately cracking the unliquefied portion of the ethane overhead and the C₃ and C₄ hydrocarbons constituting the condensate from the fractionation of the ethane subfraction to convert at least a portion thereof to ethylene, separating from the cracked products substantially all hydrocarbons containing more than four carbon atoms in each molecule, and adding the remaining lighter cracked products to said stream prior to said first-mentioned fractionation.

4. The method of treating a stream of gases comprising essentially normally gaseous paraffinic and olefinic hydrocarbons having from one to four atoms in each molecule to produce ethylene therefrom which comprises, fractionating said stream into a liquid substream containing a major proportion of the ethane and higher boiling hydrocarbons of said stream and a gaseous overhead substream containing a major proportion of the ethylene and lighter components of said stream, fractionating the ethane substream to produce a gaseous overhead containing substantially all the ethane of said substream, refrigerating said ethane overhead under pressure to liquefy a portion thereof and refluxing a portion of said liquefied ethane overhead to the fractionation of the ethane substream, expanding a portion of said liquefied ethane overhead in indirect contact with the ethylene overhead from the first-mentioned fractionation to liquefy a portion thereof, and refluxing said liquefied ethylene overhead to said first-mentioned fractionating operation.

5. The method of treating a stream of gases comprising essentially normally gaseous paraffinic and olefinic hydrocarbons having from one to four atoms in each molecule to produce ethylene therefrom which comprises, fractionating said stream into a liquid substream containing a major proportion of the ethane and higher boiling hydrocarbons of said stream and a gaseous overhead substream containing a major proportion of the ethylene and lighter components of said stream, fractionating the ethane substream to produce a gaseous overhead containing substantially all the ethane of said substream, refrigerating said ethane overhead under pressure to liquefy a portion thereof, fractionating the ethylene substream to produce a gaseous overhead comprising essentially fixed gases and a liquid fraction consisting essentially of liquefied ethylene and containing substantially all the ethylene contained in said substream, and expanding a portion of said liquefied ethane overhead in indirect contact with the gaseous overhead from the fractionation of said ethylene substream to liquefy a portion thereof and refluxing said liquefied gaseous overhead to said fractionating operation.

JAMES S. CAREY.